(12) United States Patent
Wockatz

(10) Patent No.: US 9,371,604 B2
(45) Date of Patent: Jun. 21, 2016

(54) MULTIAXIAL NON-CRIMP FABRICS HAVING POLYMER NON-WOVENS

(75) Inventor: Ronny Wockatz, Wuppertal (DE)

(73) Assignee: TOHO TENAX EUROPE GMBH, Wuppertal (DE)

(*) Notice: Subject to any disclaimer, the term of this patent is extended or adjusted under 35 U.S.C. 154(b) by 230 days.

(21) Appl. No.: 13/578,435

(22) PCT Filed: Mar. 11, 2011

(86) PCT No.: PCT/EP2011/053658
§ 371 (c)(1),
(2), (4) Date: Aug. 10, 2012

(87) PCT Pub. No.: WO2011/113752
PCT Pub. Date: Sep. 22, 2011

(65) Prior Publication Data
US 2012/0309248 A1  Dec. 6, 2012

(30) Foreign Application Priority Data

Mar. 18, 2010 (EP) ..................... 10002870

(51) Int. Cl.
| | | |
|---|---|---|
| D04H 13/00 | (2006.01) |
| D04B 21/16 | (2006.01) |
| B29C 70/20 | (2006.01) |
| B32B 5/12 | (2006.01) |
| B32B 5/26 | (2006.01) |
| C08J 5/24 | (2006.01) |
| D04H 3/045 | (2012.01) |
| D04H 3/147 | (2012.01) |
| D04H 3/153 | (2012.01) |
| B29B 11/16 | (2006.01) |
| B29K 63/00 | (2006.01) |
| B29K 77/00 | (2006.01) |
| B29K 101/12 | (2006.01) |
| B29K 105/08 | (2006.01) |

(52) U.S. Cl.
CPC ............ *D04B 21/165* (2013.01); *B29C 70/202* (2013.01); *B32B 5/12* (2013.01); *B32B 5/26* (2013.01); *C08J 5/24* (2013.01); *D04H 3/045* (2013.01); *D04H 3/147* (2013.01); *D04H 3/153* (2013.01); *B29B 11/16* (2013.01); *B29K 2049/00* (2013.01); *B29K 2063/00* (2013.01); *B29K 2077/00* (2013.01); *B29K 2101/12* (2013.01); *B29K 2105/0854* (2013.01); *B32B 2250/20* (2013.01); *D10B 2403/02412* (2013.01); *D10B 2505/02* (2013.01); *Y10T 442/60* (2015.04)

(58) Field of Classification Search
CPC ...... D04B 21/165; B29C 70/202; B32B 5/12; B32B 5/26; B32B 2250/20; C08J 5/24; D04H 3/045; D04H 3/147; D04H 3/153; Y10T 442/60; B29B 11/16; B29K 2063/00; B29K 2077/00; B29K 2101/12; B29K 2105/0854; D10B 2403/02412; D10B 2505/02
USPC .................. 442/361, 366, 381, 389, 390, 414; 428/114

See application file for complete search history.

(56) References Cited

U.S. PATENT DOCUMENTS

| | | | |
|---|---|---|---|
| 4,696,853 A | 9/1987 | Fourezon | |
| 6,890,476 B2 | 5/2005 | Wagener et al. | |
| 6,995,099 B1 | 2/2006 | Nishimura et al. | |
| 2004/0053028 A1 | 3/2004 | Wagener et al. | |
| 2004/0113317 A1* | 6/2004 | Healey et al. | 264/292 |
| 2004/0241415 A1* | 12/2004 | Wadahara et al. | 428/298.1 |
| 2005/0164578 A1 | 7/2005 | LoFaro et al. | |
| 2006/0216504 A1* | 9/2006 | Sutter et al. | 428/364 |
| 2006/0252334 A1 | 11/2006 | LoFaro et al. | |
| 2007/0196619 A1 | 8/2007 | Carter et al. | |
| 2007/0202762 A1 | 8/2007 | Hirawaki et al. | |
| 2008/0289743 A1 | 11/2008 | Tsotsis | |
| 2012/0100354 A1* | 4/2012 | Beraud et al. | 442/334 |

FOREIGN PATENT DOCUMENTS

| | | |
|---|---|---|
| DE | 35 35 272 A1 | 4/1987 |
| DE | 198 09 264 A1 | 9/1999 |
| DE | 199 13 647 A1 | 9/2000 |
| DE | 199 25 588 A1 | 12/2000 |

(Continued)

OTHER PUBLICATIONS

International Search Report issued in International Patent Application No. PCT/EP2011/053658 dated Jun. 6, 2011.

(Continued)

*Primary Examiner* — Jeremy R Pierce
(74) *Attorney, Agent, or Firm* — Oliff PLC

(57) ABSTRACT

A non-crimp fabric includes at least two superimposed layers made from multifilament reinforcing yarns arranged parallel to each other, and at least one layer made from a non-woven made from thermoplastic polymer material on and/or between the layers made from multifilament reinforcing yarns, wherein the non-woven includes a first polymer component and a second polymer component whose melting temperatures lie below the melting or decomposition temperature of the reinforcing yarns. The first polymer component has a lower melting temperature than the second polymer component, and the first polymer component is soluble in epoxy matrix resins, cyanate ester matrix resins, benzoxazine matrix resins, or mixtures thereof. The second polymer component is not soluble in epoxy matrix resins, cyanate ester matrix resins, benzoxazine matrix resins, or mixtures thereof. A preform is made from the non-crimp fabric.

14 Claims, No Drawings

(56) References Cited

FOREIGN PATENT DOCUMENTS

| | | |
|---|---|---|
| DE | 102 52 671 C1 | 12/2003 |
| EP | 0 193 479 B1 | 9/1986 |
| EP | 0 310 200 A2 | 4/1989 |
| EP | 0 361 796 A2 | 4/1990 |
| EP | 0 672 776 A1 | 9/1995 |
| EP | 1 057 605 A1 | 12/2000 |
| EP | 1 473 132 A2 | 11/2004 |
| EP | 1 705 269 A1 | 9/2006 |
| EP | 1 772 258 A1 | 4/2007 |
| FR | 2 594 858 A1 | 8/1987 |
| GB | 2451136 A * | 1/2009 ............ B29C 70/08 |
| JP | 2002-227067 A | 8/2002 |
| JP | 2003-080607 A | 3/2003 |
| JP | 2005-313455 A | 11/2005 |
| WO | WO 98/10128 A1 | 3/1998 |
| WO | 00/56539 A1 | 9/2000 |
| WO | WO 02/16481 A1 | 2/2002 |
| WO | WO 02/057527 | 7/2002 |

OTHER PUBLICATIONS

Sep. 18, 2012 International Preliminary Report on Patentability issued in PCT/EP2011/053657 (English language version only).

U.S. Appl. No. 13/581,782, filed Aug. 29, 2012, in the name of Ronny Wockatz.

English translation of Feb. 20, 2015 Office Action issued in Japanese Application No. 2012-557494.

\* cited by examiner

MULTIAXIAL NON-CRIMP FABRICS HAVING POLYMER NON-WOVENS

TECHNICAL FIELD

The invention relates to a non-crimp fabric made from at least two superimposed layers made from multifilament reinforcing yarns, wherein the non-crimp fabric has on and/or between the layers made from multifilament reinforcing yarns at least one layer made from a non-woven made from thermoplastic polymer material.

BACKGROUND

Non-crimp fabrics made from reinforcing fibers or yarns have long been known on the market. For this purpose multiaxial non-crimp fabrics are often used that have a structure made from a plurality of superimposed fiber layers, wherein the fiber layers consist of sheets of reinforcing fibers arranged parallel to each other. The fiber layers are superimposed such that the reinforcing fibers of the layers are oriented parallel to each other or alternately crosswise. The angles are virtually infinitely adjustable. Usually however, for multiaxial non-crimp fabrics angles of 0°, 90°, plus or minus 25°, plus or minus 30°, plus or minus 45°, or plus or minus 60° are set and the structure is selected such that a symmetrical structure with respect to the zero-degree direction results.

Fabrics such as the cited multiaxial non-crimp fabrics can be used due to their structure especially for the manufacturing of complex constructions. The non-crimp fabrics are thereby laid without matrix material in a mold and are adapted to the contours thereof. By this means, a so-called preform is obtained, into which the matrix material required for producing the composite component can subsequently be introduced via infusion or injection, or also by the application of vacuum. Known methods are the so-called liquid molding (LM) method, or methods related thereto such as resin transfer molding (RTM), vacuum assisted resin transfer molding (VARTM), resin film infusion (RFI), liquid resin infusion (LRI), or resin infusion flexible tooling (RIFT).

Fiber composite components produced using non-crimp fabrics of this type made from reinforcing fibers are suited in a superb way to directly counteract the forces introduced from the directions of stress of the component and thus ensure high tenacities. The adaptation in the multiaxial non-crimp fabrics with respect to the fiber densities and fiber angles, to the load directions present in the component enables low specific weights.

The superimposed fiber layers can be connected and secured to each other via a plurality of sewing or knitting threads arranged adjacent to each other and running parallel to each other forming stitches, such that the multiaxial non-crimp fabric is stabilized in this way. The sewing or knitting threads thereby form the zero-degree direction of the multiaxial non-crimp fabric. Multiaxial non-crimp fabrics of this type can be produced e.g. by means of standard warp knitting looms or stitch bonding machines, for example by means of the LIBA machines or Karl Mayer machines known to a person skilled in the art. Multiaxial non-crimp fabrics connected by means of sewing or knitting threads and the manufacture thereof are described for example in DE 102 52 671 C1, DE 199 13 647 B4, WO 98/10128, or EP 0 361 796 A1.

EP 1 352 118 A1 discloses multiaxial non-crimp fabrics, for which the layers of the reinforcing fibers are held together by means of fusible sewing yarns which enable a good shapeability of the multiaxial non-crimp fabrics above the melting temperature of the sewing threads and a stabilization of the shape during subsequent cooling. Sewing threads made from thermoplastic polymers such as polyamide or polyester are often used, as is disclosed in EP 1 057 605 for example.

A preproduct for a composite preform is described in US 2005/0164578, which preproduct has at least one layer made from a reinforcing fiber woven fabric and in which fibers for stabilization are integrated in at least one of the layers, which fibers stabilize the preform when they are subjected to increased temperatures and which fibers dissolve in the matrix resin introduced later for the production of the composite component. WO 02/16481 also discloses structures made from reinforcing fibers for e.g. preforms, wherein the structures contain flexible polymer elements which are e.g. introduced in the form of fibers between the reinforcing fibers or as sewing threads that connect the reinforcing fibers with each other. The flexible polymer elements comprise a material that is soluble in the hardenable matrix material used.

According to DE 198 09 264 A1, adhesive non-wovens made from thermoplastic polymers can be inserted between the layers, which are sewn to each other and made from reinforcing fibers, of the fiber fabric arrangements disclosed therein. Due to these meltbonded non-wovens, the fiber fabric arrangements can be shaped in a simple way, when heated above the melting temperature of the polymer forming these non-wovens, into three-dimensional structures which maintain their shape after cooling practically without reset forces.

Also, sometimes randomly-laid fiber mats or non-wovens, or staple fiber fabrics or mats, are to some extent laid between the layers made from reinforcing fibers in order to improve e.g. the impregnability of the non-crimp fabrics or to improve e.g. the impact strength. Multiaxial non-crimp fabrics of this type having mat-like intermediate layers are described for example in DE 35 35 272 C2 or US 2007/0202762, wherein values of mass per unit area between 100 and 1200 g/m² are disclosed for the non-wovens or mats in DE 35 35 272 C2 and values of mass per unit area of 40 g/m² to 161 g/m² in US 2007/0202762.

EP 1 473 132 has as its subject matter multiaxial non-crimp fabrics and a method for the production of said multiaxial non-crimp fabrics as well as the preforms produced from the multiaxial non-crimp fabrics. The multiaxial non-crimp fabrics described therein have intermediate layers made from thermoplastic fibers between the layers made from reinforcing fibers laid unidirectionally, wherein the intermediate layers can be non-wovens made from bicomponent fibers or hybrid nonwovens made from different fibers mixed together. The polymer forming the intermediate layers should be compatible with the matrix resin injected later in the preform. In particular, it is explained that the intermediate layers should be permeable for the matrix resin during the resin infusion and should secure the reinforcing layers during and after the resin infusion. In the case of use of epoxy resins, the nonwovens are made from polyamide fibers. The nonwovens can be connected to the layers made from reinforcing fibers via knitted stitches or via meltbonding.

EP 1 772 258, too, discloses a laminate structure for the production of fiber reinforced plastic parts. These laminate structures have a non-woven layer with volumes of mass per unit area from 100 to 500 g/m² as a core layer and at least one cover layer made from reinforcing fibers. The non-woven layer is for example a fiber mixture made from support fibers and thermoplastic binding fibers and the melting point of the binding fibers is lower than that of the support fibers. During heat treatment at a temperature above the melting point of the binding fibers and below the melting point of the support fibers, a thermal reinforcing of the non-woven layer is achieved according to EP 1 772 258 and thereby a higher internal strength and dimensional stability of the non-woven layer. At the same time, the non-woven layer guarantees a high permeability during the infiltration with matrix resin.

US 2008/0289743 A1 discloses multiaxial non-crimp fabrics made from alternatingly arranged layers of reinforcing fibers and non-wovens made from thermoplastic fibers as intermediate layers, wherein the intermediate layers are arranged between the reinforcing layers and are connected to the same via knitted stitches or meltbonding. In one embodiment, the non-wovens can be constructed from two or more materials and are thus hybrid nonwovens or bi-component or tri-component non-wovens, etc. According to a particular embodiment, a non-woven can be made from core/sheath fibers with a core made from polyamide and a sheath made from polyurethane. The non-wovens additionally serve to secure the unidirectionally arranged reinforcing fibers and to guarantee the resin flow during the resin infiltration. In a preferred embodiment, the curing should take place at temperatures below the melting temperature of the thermoplastic fibers of the intermediate layer.

A disadvantage of the previously described composite constructions of the prior art is the relatively high proportion of material that does not consist of reinforcing fibers and thus does not contribute to the strength of the resulting component. The matrix material must be referred to the total amount of reinforcing fibers and non-woven, such that, in relation to the component volumes, a lower proportion of reinforcing fibers in the component and thus in lower strength results.

EP 1 705 269 discloses a thermoplastic fiber material made from a polyhydroxy ether, which e.g. can be used in the case of multiaxial non-crimp fabrics made from reinforcing fibers, e.g. as a non-woven between the layers made from reinforcing fibers. Under application of heat, the polyhydroxy ether material becomes viscous and sticky, such that a fixation of the reinforcing fibers in a defined geometric arrangement can be achieved prior to their embedding in the matrix. The polyhydroxy ether fiber material then later dissolves completely in the matrix material at a temperature above its glass transition temperature.

Non-crimp fabrics made from a plurality of layers of reinforcing fibers are described in US 2006/0252334, which contain e.g. non-wovens made from polymer fibers between the reinforcing layers to improve the impact strength of the components produced from these non-crimp fabrics. These polymer fibers should thereby be soluble in the matrix resin, by which means according to the statements of US 2006/0252334 a more uniform distribution of the polymer forming these fibers in the resin matrix is enabled in comparison to meltable, insoluble thermoplastics.

Because the polymer fibers for the fabrics of US 2006/0252334 and EP 1 705 269 are soluble in the matrix material and as a result dissolve during the infiltration of the non-crimp fabrics with matrix resin, a secure fixation of the reinforcing layers in this stage of the component production is not sufficiently guaranteed.

There exists therefore a need for non-crimp fabrics, based on reinforcing fibers that have a good drapability and dimensional stability after the shaping into preforms as well as a good permeability during the infiltration of matrix resins. At the same time, the components produced from these non-crimp fabrics should possess high strength properties in particular under application of pressure, and a high impact strength.

SUMMARY

The underlying object of the present invention is therefore to provide non-crimp fabrics of this type.

DETAILED DESCRIPTION

The object is achieved by a non-crimp fabric made from at least two superimposed layers made from multifilament reinforcing yarns arranged parallel to each other, wherein the non-crimp fabric has at least one layer made from a non-woven made from thermoplastic polymer material on and/or between the layers made from multifilament reinforcing yarns, and wherein the non-woven comprises a first polymer component and a second polymer component whose melting temperatures lie below the melting or decomposition temperature of the reinforcing yarns, characterized in that the first polymer component has a lower melting temperature than the second polymer component and that the first polymer component is soluble in epoxy matrix resins, cyanate ester matrix resins, or benzoxazine matrix resins or in mixtures of these matrix resins and the second polymer component is not soluble in epoxy matrix resins, cyanate ester matrix resins, or benzoxazine matrix resins or in mixtures of these matrix resins.

Preferably the first polymer component has a melting temperature in the range between 80 and 135° C. and the second polymer component has a melting temperature in the range between 140 and 250° C.

Based on its specific structure, the non-crimp fabric according to the invention distinguishes itself by a good drapability and fixability of the non-crimp fabric layers in the preform, by a good permeability during the infiltration with matrix resin and that components with high mechanical strengths and with high impact strength can be produced using them. Due to the at least one non-woven layer made from the polymer combination according to the invention, a movement of the non-crimp fabric layers against one another can be achieved during heating to the melting temperature of the first polymer component. The molten first component of the non-woven functions quasi as a lubricant such that the layers of the reinforcing yarns can slide into the desired position in the preform during the shaping process. During cooling of the preform, the first polymer component then functions as a hot-melt adhesive and fixes the reinforcing layers in their positions.

During the subsequent infiltration of the non-crimp fabric structure with matrix resin, which generally takes place at temperatures above the melting temperature of the first component yet below the melting temperature of the second component, a good permeability for the matrix resin is guaranteed by the higher melting second polymer component of the at least one non-woven according to the invention. In contrast, the first polymer component dissolves in the matrix resin and in this way loses its identity as an independent phase with respect to the matrix resin. Therefore, the proportion of the first polymer component is thus to be associated with the matrix material and the proportion of matrix resin to be infiltrated can be reduced by the proportion of the first polymer component. As a result, high fiber volume proportions of the reinforcing fibers can be set in the resulting component and thus the level of mechanical strength properties can be held at a high level.

The non-woven used in the non-crimp fabric according to the invention can thus consist of a mixture of mono-component fibers with differing melting temperatures, and can thus be a hybrid non-woven. However, the non-woven can also consist of bi-component fibers, for example of core/sheath fibers, whereby the core of the fiber is made from a higher-melting polymer and the sheath is made from a lower-melting polymer. Similarly to a non-woven made from bi-component fibers, the non-woven can also be made e.g. from a random laid layer of fibers made from the second polymer component, wherein the first polymer component is applied to the fibers of the second polymer component e.g. by spraying or coating. The coating can for example result from an impregnation with a dispersion or solution of the first polymer component, wherein after the impregnation the liquid portion of the dispersion, or the solvent, is removed. It is likewise possible that a non-woven constructed from fibers made from the second polymer component contains the first polymer component in the form of fine particles embedded between the fibers of the second polymer component. Preferably the non-woven is a hybrid non-woven. It has proven advantageous if the non-woven contains the first polymer component in a proportion from 2 to 40 wt. % and the second polymer component in a proportion from 60 to 98 wt. %. Particularly preferably the proportion of the first polymer component lies in the range from 5 to 35 wt. % and the proportion of the second polymer component in the range from 65 to 95 wt. %. In a further preferred embodiment, the non-woven contains the first polymer component in a proportion from 20 to 40 wt. % and the second polymer component in a proportion from 60 to 80 wt. %.

At the curing temperature of the matrix resin, i.e. the epoxy resin, cyanate ester resin, or benzoxazine resin, the first polymer component in a preferred embodiment reacts chemically with the curing matrix resin via crosslinking reactions and thus becomes an integral part of a homogeneous matrix. Therefore, the first polymer component is preferably a polymer that reacts via chemical crosslinking reactions with epoxy matrix resins, cyanate ester matrix resins, or benzoxazine matrix resins. Particularly preferably the first polymer component is a polyhydroxy ether. Polyhydroxy ethers of this type are described e.g. in EP 1 705 269, to which explicit reference is made regarding this disclosure.

According to the invention, the second polymer component has a higher melting temperature than the first polymer component. The second polymer component preferably melts at the curing temperature of the matrix resin used or at temperatures in the range between the melting temperature of the first polymer component and the curing temperature of the matrix resin. In this way, the second polymer component is likewise bound into the matrix material; however, in contrast to the first polymer component, it forms its own phase in the cured matrix resin. This phase formed by the second polymer component helps during the curing and in the subsequent component, to limit the spread of cracks and thus contributes decisively to e.g. the increase in the impact strength.

As the second polymer component of the non-woven used in the non-crimp fabric according to the invention, polymers can be used that are commonly processed into thermoplastic fibers, as long as they comply with the claimed requirements, such as polyamides, polyimides, polyamide-imides, polyesters, polybutadienes, polyurethanes, polypropylenes, polyetherimides, polysulfones, polyethersulfones, polyphenylene sulfones, polyphenylene sulfides, polyetherketones, polyetheretherketones, polyarylamides, polyketones, polyphthalamides, polyphenylene ethers, polybutylene terephthalates, or polyethylene terephthalates, or copolymers or mixtures of these polymers.

In respect of the previously cited matrix resins, it is preferred if the second polymer component is a polyamide homopolymer or a polyamide copolymer or a mixture made from polyamide homopolymers and/or polyamide copolymers. It is particularly preferred that the polyamide homopolymer or polyamide copolymer is a polyamide 6, polyamide 6,6, polyamide 6,12, polyamide 4,6, polyamide 11, polyamide 12, or a copolymer based on polyamide 6/12.

In respect of a homogenization of the material characteristics across the non-crimp fabric thickness, it is advantageous if a non-woven layer is arranged between each layer made from multifilament reinforcing yarns in the non-crimp fabric according to the invention. In respect of the characteristics of the component produced using the non-crimp fabric according to the invention and in respect of as high a level as possible of the mechanical characteristics, it is likewise preferred if the non-woven has a mass per unit area in the range from 5 to 25 g/m². Particularly preferably the mass per unit area lies in the range from 6 to 20 g/m².

In the non-crimp fabric according to the invention, the reinforcing fibers or yarns generally used to produce fiber reinforced composites can be used as reinforcing fibers. Preferably for the multifilament reinforcing yarns, these are carbon fiber, glass fiber, or aramid yarns, or high-grade UHMW polyethylene yarns, and particularly preferably carbon fiber yarns.

In respect of a high level of the mechanical characteristics in the resulting component, it is advantageous when the reinforcing yarns are arranged parallel to each other and abutting parallel together within a layer made from multifilament reinforcing yarns. By this means, high fiber volume proportions can be achieved and zones with low fiber proportions can be avoided in the component.

In a further preferred embodiment, the reinforcing yarns of superimposed layers form an angle to each other when viewed perpendicular to the layer plane. By this means it is possible to carry out an adaptation of the direction of the reinforcing yarns with respect to the directions of stress in the subsequent component and to ensure the required strengths in these directions of stress. It is advantageous thereby, if the layers of reinforcing yarns alternate at defined angles with respect to the zero-degree direction, such that a symmetrical or quasi-isotropic structure results. Thus, the non-crimp fabric according to the invention can, for example, have a structure with a +45°, a −45°, a +45°, and a −45° layer, i.e. in which the reinforcing yarns, unidirectionally arranged within the individual layers, have an angle of +45°, −45°, +45°, and −45° to the zero-degree direction. Usually, the angles α for multiaxial non-crimp fabrics of this type are found in the range from ±20° to approximately ±80°. Typical angles α are ±25°, ±30°, ±45°, and ±60°.

In order to also accommodate e.g. further claimed directions of stress in the later component, the non-crimp fabric according to the invention comprises preferably also layers of multifilament reinforcing yarns in which the reinforcing yarns form an angle of 0° with respect to the zero-degree direction and/or layers in which the reinforcing yarns form an angle of 90° with respect to the zero-degree direction. These 0° and/or 90° layers are located preferably between the layers oriented at the angle α. However, for example, a structure having the following directions is also possible: 90°, +30°, −30°, 0° −30°, +30°, 90°, i.e. a structure in which the outer layers are formed of 90° layers.

In the non-crimp fabric according to the invention, the layers of multifilament reinforcing yarns can also consist of prefabricated unidirectional woven fabrics made from multifilament reinforcing yarns. For these unidirectional woven fabrics, the reinforcing yarns arranged parallel to each other and forming the layer in each case are connected to each other by chains made of loose binding threads, which extend essentially transverse to the reinforcing yarns. Unidirectional fabrics of this type are described for example in EP 0 193 479 81 or EP 0 672 776, to which explicit reference is made here regarding this disclosure.

In order to maintain a greater stability in the non-crimp fabrics according to the invention, especially during the resin injection, and e.g. to avoid an undesired slippage of the reinforcing layers, in a preferred embodiment of the invention, the layers made from multifilament reinforcing yarns and the at least one non-woven layer are connected to each other and secured against each other by sewing threads or stitch bonding threads forming stitches or loops and proceeding parallel to each other and separated from each other at a stitch width. The sewing threads thereby define the zero-degree direction of the non-crimp fabric.

The individual layers of the non-crimp fabrics according to the invention, constructed from multifilament reinforcing yarns, can thereby be produced by means of standard methods and apparatuses and placed superimposed at defined angles with respect to the zero-degree direction. As has already been explained, known machines in this field are the LIBA machines or the Karl Mayer machines. By this means, the reinforcing yarns can also be positioned within the layers with respect to each other such that they abut each other, i.e. they lie adjacent essentially without gaps.

The yarns usually used to produce yarn non-crimp fabrics can be considered for use as sewing threads. Within the context of the present invention, sewing threads are also understood as threads of a type that are not incorporated via sewing in the multiaxial non-crimp fabric according to the invention, but instead via other stitch or loop forming textile processes, such as in particular via knitting processes. The stitches, via which the sewing threads connect the layers of the multiaxial non-crimp fabric to each other, can have the types of weaves that are usual for multiaxial non-crimp fabrics, such as tricot knit or fringe weave. A fringe weave is preferred.

Preferably the sewing threads are multifilament yarns. Sewing yarns can be used that, during the later resin injection, e.g. melt above the resin injection temperature but below the curing temperature of the resin used. The yarns can also melt at the curing temperature. The sewing yarns can also be of the type that can dissolve in the matrix resin, e.g. during the injection or also during the curing of the resin. Sewing threads of this type are described e.g. in DE 199 25 588, EP 1 057 605, or U.S. Pat. No. 6,890,476, to which explicit reference is made regarding this disclosure. Preferably, the sewing threads consist of polyimide, polyaramid, polyester, polyacrylic, polyhydroxy ether, or copolymers of these polymers. The sewing threads consist particularly preferably of multifilament yarns made from polyester, polyamide, or polyhydroxy ether, or copolymers of these polymers.

It is advantageous if the sewing threads have a elongation at break of ≥50% at room temperature. Due to the high elongation at break, an improved drapability of the multiaxial non-crimp fabrics according to the invention is achieved, by which means more complex structures or components can also be realized.

In a particular embodiment of sewn or knitted non-crimp fabrics according to the invention, the sewing threads have a linear density in the range from 10 to 35 dtex. Namely, it has been shown that in particular the stability is significantly improved with respect to compression loading if the linear density of the sewing threads in the non-crimp fabric lies in the stated range. This is ascribed to the fact that the fiber structure of the individual fiber layers is significantly homogenized, compared to known multiaxial non-crimp fabrics, due to the use of sewing threads of this type. In particular it has been determined that the filaments of the reinforcing yarns show a straighter course than is the case for non-crimp fabrics of the prior art. The sewing threads particularly preferably have a linear density in the range from 10 to 30 dtex and even more particularly preferably a linear density in the range from 15 to 25 dtex.

As explained, the sewing threads form stitches or loops and define the zero-degree direction of the non-crimp fabric. In the case that the reinforcing yarns of the layers are symmetrically arranged in respect to the zero-degree direction of the non-crimp fabric, and, with respect to direction of their extension, form an angle α to the zero-degree direction, said angle being not equal to 90° and not equal to 0°, with respect of the tenacity with regard to compression loading and/or impact loading of composite components produced with the multiaxial non-crimp fabrics according to the invention, it was further surprisingly found that an especially good level of tenacity is achieved if the stitch length s of the stitches formed by the sewing threads is dependent on the stitch width w and also on the angle $\alpha_1$ of the reinforcing yarns in the multiaxial non-crimp fabric according to the invention, satisfying the following relations (I) and (II):

$$2 \text{ mm} \leq s \leq 4 \text{ mm} \qquad (I)$$

and $$s = n \cdot B \cdot \frac{w \cdot |\tan\alpha_1|}{2.3}, \qquad (II)$$

where the multiplier B can assume values in the range of 0.9≤B≤1.1 and n can assume the values 0.5, 1, 1.5, 2, 3, or 4, whereby also for small values of w·|tan $\alpha_1$|/2.3, the stitch length s lies in the range required according to equation (I). The stitch width w, i.e. the distance between the sewing threads is thereby indicated in mm.

The angle $\alpha_1$ is understood to be the angle to the zero-degree direction, when viewed from above, at which the reinforcing yarns of the first layer of the multiaxial non-crimp fabric are arranged whose reinforcing yarns have an angle differing from 90° and 0° to the zero-degree direction. In the case that the reinforcing yarns of the top-most layer or the top-most layers of the multiaxial non-crimp fabric have an angle of 90° or 0° to the zero-degree direction, then the first layer arranged below this layer or below these layers is considered whose reinforcing yarns have an angle differing from 90° and 0°.

Upon examination of the fiber structure, i.e. the course of the fibers or the filaments of the multifilament reinforcing yarns in the layers of the non-crimp fabric, it was found that by complying with the relations (I) and (II) a very even course of the fibers resulted with a significantly reduced waviness of the yarns and a significantly reduced appearance of gaps between yarn bundles. For this purpose it is obviously critical that, along the course of a yarn bundle or fiber strand, the sewing threads pierce the fiber strand at different positions over the width of the fiber strand. For values usually set with respect to stitch length and stitch width outside of the ranges defined by the relations (I) and (II), it has been observed that the penetration of the sewing threads along the extension of the reinforcing yarns occurs essentially between the same threads or filaments or the same regions of the fiber strand or the reinforcing yarn. This leads to pronounced waviness or undulation in the course of the yarn and to the formation of gaps between filaments.

Altogether it was found that when using the preferred sewing threads with low linear density and when complying to the above-cited relations (I) and (II) in the view from above of the layers of the reinforcing yarns, the fiber deflection caused by the penetration points of the sewing threads in the non-crimp fabric, also referred to as the undulation angle, can be reduced by up to approximately 25%. At the same time, the resulting undulation areas, i.e. the areas or regions in which the filaments or threads show a deflection, can be reduced by approximately 40% and the free spaces between fibers, which lead to regions with increased proportion of resin and reduced tenacity in the component, particularly under compression loading, are thus significantly reduced.

At the same time, by reference to micrographs of composite laminates based on the multiaxial non-crimp fabrics according to the invention, it could be observed that by using the preferred sewing threads with low linear density, surprisingly a significant homogenization of the course of the reinforcing threads was achieved in the direction of observation parallel to the extension of the layers of the reinforcing yarns and perpendicular to the extension of the reinforcing yarns. Thus, by using a sewing thread with a linear density of 23 dtex, an essentially linear course of the filaments of the reinforcing yarns was achieved. By using a sewing thread with a linear density outside of the preferred range, already at a linear density of 48 dtex, when viewed across the stated cross section of the composite laminate, all filaments showed a very irregular, wave-shaped course with variation amplitudes on the order of the thickness of one layer of reinforcing threads.

The stitch length can lie in the range from 2 mm to 4 mm. At stitch lengths above 4 mm, a sufficient stability of the non-crimp fabric according to the invention can no longer be guaranteed. Below 2 mm, in contrast, an excessively high number of imperfections appear in the non-crimp fabric. In addition, the economy of the production of the multiaxial non-crimp fabrics is greatly reduced.

The non-crimp fabrics according to the invention are distinguished by a good drapability and by a good resin permeability. In addition, they enable the production of components with high stability against compression loading and high tolerance to impact loading They are therefore especially suitable for the production of so-called preforms, from which more complex fiber composite components are produced. Therefore the present invention relates especially also to preforms for the production of fiber composite components which contain the non-crimp fabrics according to the invention.

The invention claimed is:

1. A non-crimp fabric comprising:
   at least two superimposed layers made from multifilament reinforcing yarns arranged parallel to each other, and
   at least one layer made from a non-woven made from thermoplastic polymer material on and/or between the layers made from multifilament reinforcing yarns,
   wherein
   the non-woven comprises a first thermoplastic polymer component and a second thermoplastic polymer component whose melting temperatures are below a melting or decomposition temperature of the reinforcing yarns,
   the melting temperature of the first thermoplastic polymer component is lower than the melting temperature of the second thermoplastic polymer component,
   the first thermoplastic polymer component is soluble in epoxy matrix resins, cyanate ester matrix resins, benzoxazine matrix resins, or mixtures thereof,
   the second thermoplastic polymer component is not soluble in epoxy matrix resins, cyanate ester matrix resins, benzoxazine matrix resins, or mixtures thereof, and
   the non-woven contains the first thermoplastic polymer component in a proportion from 2 to 40 wt % and the second thermoplastic polymer component in a proportion from 60 to 98 wt %.

2. The non-crimp fabric according to claim 1, wherein the melting point of the first polymer component is between 80 and 135° C., and the melting temperature of the second polymer component is between 140 and 250° C.

3. The non-crimp fabric according to claim 1, wherein the non-woven is a hybrid non-woven.

4. The non-crimp fabric according to claim 1, wherein the second polymer component is a polyamide homopolymer, a polyamide copolymer, or a mixture of polyamide homopolymers and/or polyamide copolymers.

5. The non-crimp fabric according to claim 4, wherein the polyamide homopolymer or polyamide copolymer is a polyamide 6, a polyamide 6,6, a polyamide 6,12, a polyamide 4,6, a polyamide 11, a polyamide 12, or a copolymer based on polyamide 6/12.

6. The non-crimp fabric according to claim 1, wherein the first polymer component is a polymer that reacts chemically with epoxy matrix resins, cyanate ester matrix resins, or benzoxazine matrix resins via crosslinking reactions.

7. The non-crimp fabric according to claim 6, wherein the first polymer component is a polyhydroxy ether.

8. The non-crimp fabric according to claim 1, wherein the at least one non-woven layer has a mass per unit area from 5 to 25 g/m$^2$.

9. The non-crimp fabric according to claim 1, wherein a non-woven layer is arranged between each of the layers of multifilament reinforcing yarns.

10. The non-crimp fabric according to claim 1, wherein the multifilament reinforcing yarns are carbon fiber yarns, glass fiber yarns, aramid yarns, or high-grade UHMW polyethylene yarns.

11. The non-crimp fabric according to claim 1, wherein the reinforcing yarns of superimposed layers form an angle to each other when viewed perpendicular to a layer plane.

12. The non-crimp fabric according to claim 1, wherein the layers made from multifilament reinforcing yarns and the at least one non-woven layer are connected to each other by sewing threads running parallel to each other and separated from each other.

13. The non-crimp fabric according to claim 12, wherein
   the reinforcing yarns within one layer as well as adjacent layers are connected to each other and secured against each other by sewing threads separated from each other at a stitch width w,
   the sewing threads form stitches with a stitch length s,
   a zero-degree direction of the non-crimp fabric is defined by the sewing threads,
   the reinforcing yarns of the layers are symmetrically arranged in respect to the zero-degree direction of the non-crimp fabric and, with respect to a direction of their extension, form an angle α to the zero-degree direction,
   the angle is not equal to 90° and not equal to 0°,
   the sewing threads have a linear density from 10 to 35 dtex, and
   the stitch length s of the sewing threads depends on the stitch width w as well as on an angle $α_1$ of the reinforcing yarns and satisfies relations (I) and (II):

$$2 \text{ mm} \leq s \leq 4 \text{ mm} \quad (I)$$

$$s = n \cdot B \cdot \frac{w \cdot |\tan\alpha_1|}{2.3} \quad (II)$$

where
w = stitch width [mm],
$0.9 \leq B \leq 1.1$,
n 0.5, 1, 1.5, 2, 3, or 4, and
the angle $\alpha_1$ is the angle to the zero-degree direction, when viewed from above, at which reinforcing yarns of a first layer of the multiaxial non-crimp fabric are arranged and have an angle differing from 90° and 0° to the zero-degree direction.

14. A preform for producing composite components, wherein the preform comprises the non-crimp fabric according to claim 1.

* * * * *